United States Patent Office 3,124,487
Patented Mar. 10, 1964

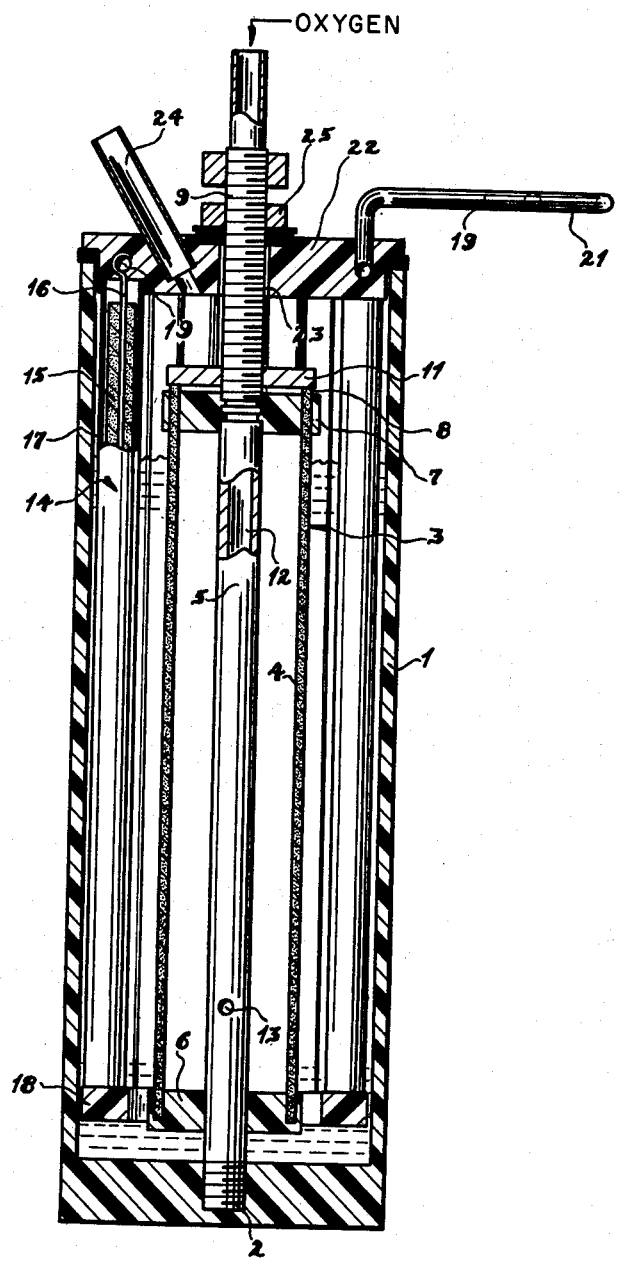

3,124,487
GAS DEPOLARIZED CELL
Joseph C. Duddy, Trevose, Pa., and James W. Consolloy, Pennington, N.J., assignors to The Electric Storage Battery Company, a corporation of New Jersey
Filed Nov. 4, 1960, Ser. No. 67,225
6 Claims. (Cl. 136—136)

The present invention generally relates to gas depolarized cells or fuel cells. More specifically, the present invention is concerned with a gas depolarized cell of the type having a rechargeable anode.

The general object of the present invention is to provide a new and improved cell of the type described characterized by compact design and ease of manufacture.

Another object of the present invention is to provide a new and improved rechargeable anode for a cell of the type described which is adapted for easy removal for recharging and which is also adaptable to be recharged in situ.

Still another object of the present invention is to provide a new and improved gas electrode assembly adapted by a change in electrical connection thereto to function as a dummy electrode for the in situ recharging of the anode.

In carrying out the present invention, there is provided a cylindrical container threaded at the bottom on center to receive and retain the gas electrode assembly. The gas electrode utilized comprises a microporous cylinder of sintered silver or nickel and silver particles with an insulating cap on each end. The gas electrode is supported on its axis by an oxygen feed tube, which is adapted to be screwed into the bottom of the container. The opposite end of the gas feed tube is adapted to function as the electrical contact with the electrode by means of a threaded connection with the microporous electrode cylinder. Upon breaking of this connection between the gas feed tube and the electrode cylinder, the feed tube may function as a dummy electrode for the recharging of the cell anode. The anode of the cell, in accordance with the present invention, comprises a plurality of pencils of a suitable active material such as zinc, cadmium or iron bound in a matrix of porous thermoplastic and surrounded by retaining tubes of a porous fabric or other similar construction adapted to prevent any substantial migration of the electrode active material particles. Each of the active material pencils has a conductive central core which make connection with the electrode terminal. The bottom section of the active material pencils are tied together in a cylindrical form by means of a molded plastic base. The anode assembly is adapted to fit concentrically into the container around the gas electrode. The cell utilizes a conventional alkaline electrolyte and has been found to operate efficiently utilizing either oxygen or chlorine as its gaseous depolarizer.

For a better understanding of the present invention, reference may be had to the following detailed description when read with reference to the accompanying drawing which is a side elevation of a gas depolarized cell of the present invention.

Referring now to the drawing, the numeral 1 indicates a cell container which may be made of a suitable insulating material such as plastic or hard rubber. As shown, the bottom of the container 1 is threaded at 2 for the mounting of a gas electrode assembly generally designated 3. The electrode element of the assembly 3 comprises a microporous cylinder 4 of sintered metal particles. The electrode 4 is preferably made in accordance with the teachings of the co-pending application Serial No. 33,948, now Patent 3,062,909, of J. C. Duddy, filed June 6, 1960, assigned to the assignee of the present invention. As taught in that application, the electrode 4 is produced by a process in which two intimately mixed incompatible thermoplastic resins, one of which is soluble in a solvent and the other is insoluble, are utilized as a temporary binder for the powdered metal electrode material to be structurized by subsequent sintering. The soluble thermoplastic resin is removed after the shaping of an electrode but prior to the sintering thereof to leave the electrode to be sintered porous. In this manner there is provided uniformly distributed pores in the electrode for the escape of the gaseous products produced by the thermal decomposition of the insoluble thermoplastic resin during sintering. Following the removal of the soluble resin phase, an electrode is heated to a temperature of about 375° F. to 450° F. to remove therefrom the low molecular factions of the insoluble thermoplastic resin. This heat treatment step is carried out while the electrode is rotated so that it maintains its cylindrical shape. The electrode is next heated to a temperature of about 450° F. to 550° F. to remove therefrom the remainder of the insoluble resin and to lightly sinter the electrode material. It is then further heated to the sintering temperature customary for the material from which the electrode is made to further strengthen the bond between the sintered particles. The electrode 4 is preferably made of sintered finely divided silver particles or a mixture of finely divided silver and nickel particles in which the nickel is present in an amount from 10% to 90%. Polyethylene oxide, which is water soluble, is the preferable soluble resin binder utilized while polyethylene is preferably used as the non-soluble resin binder.

The electrode 4 is supported and mounted in the cell container 1 by means of a gas feed tube 5. The electrode 4 is in turn mounted on the gas feed tube 5 by means of a pair of molded end caps 6 and 7 which seal the ends of the electrode 4. An epoxy resin has been found to be a suitable material for molding the end caps 6 and 7. As shown, the top end of the electrode 4 extends through and slightly beyond the end cap 7 to provide a contacting surface 8 for making electrical connection to the electrode. For this purpose the gas feed tube 5 is threaded at 9 and provided with a nut 11 of substantially the same diameter as the diameter of the cylinder 4. Accordingly, contact is made between the gas feed tube 5 and the electrode 4 by screwing the nut 11 downward into contact with the cylinder 4 at the contacting surface 8. The lower end of the gas feed tube 5 is also threaded for screwing the electrode assembly into the container 1 at 2. As shown the gas feed tube 5 is provided with a central gas passage 12, which extends substantially the length of the feed tube 5 terminating near the lower end of the electrode 4 at the oxygen input port 13.

The anode 14 of the oxygen depolarized cell in accordance with the present invention comprises a plurality of spaced pencils 15 of active material, each provided with a central conductive wire or spine 16. The active material pencils 15 preferably comprise finely divided particles of zinc, cadmium or iron bound in a porous matrix of a thermoplastic resin. For ease of manufacture, the pencils are preferably extruded directly around the conductive spines 16. Each of the active material pencils 15 are enclosed by an active material retaining tube 17 which is necessarily porous so as not to unduly impede ionic transfer therethrough. The tubes 17 may be braided, knitted or woven, preferably of synthetic resin threads such as nylon, polyvinyl chloride, or glass, which are inert to the electrochemical reaction within the cell. Still further, the retaining tubes 17 may be woven according to the teachings of the U.S. Patent No. 2,350,752, issued June 6, 1944, to Ernest Graf, thereby providing a connecting web between each of the tubes. As shown, the bottoms of the enclosed tubes are connected together by a bottom bar 18 which forms them into a cylinder. The bottom bar 18 may expeditiously be formed by casting it in situ around the oriented pencils and for this purpose an epoxy resin may be utilized. The individual pencils of active material are electrically connected together by a connecting strap 19 which, as shown, is provided with an eyelet 21 adapted for electrical connection to the gas feed tube of the adjacent cell for series operation. To provide good physical and electrical connection of the individual pencils to the conductor 19, the conductive spine 16 of each of the active material pencils 15 is hooked around the conductor 19 and soldered thereto. In order to insulate conductor 19 electrically from the gas electrode assembly 3, the anode 14 is provided with a cast on top 22 which functions as a top cover for the cell. The cell cover 22 is provided with a center opening 23 adapted to fit over the gas feed tube 5 of the gas electrode assembly and also with a gas exhaust tube 24. The cover 22 and the anode 14 is held in place by means of a nut 25 which can be screwed on to the gas feed tube 5.

The active material pencils 15 are preferably made in accordance with the teachings of the co-pending applications, Serial Nos. 818,638 and 818,766 of J. C. Duddy, filed June 8, 1959, assigned to the assignee of this invention, and now abandoned and refiled as a continuation-in-part application Serial No. 147,702 on October 13, 1961, which continuation-in-part application has been allowed. By way of example of a specific formulation for the pencils 15, made in accordance with the teachings of the aforementioned applications, 3 parts by weight of a first thermoplatsic resin such as polyethylene oxide which is soluble in water, and 1 part of a second thermoplastic resin such as polyethylene, which is incompatible with polyethylene oxide and which is insoluble in water, are intimately mixed under heat and pressure to produce a plasticized mass. After the plasticization and intimate mixing of the two resins, there is added to the plasticized mass, 28 parts by weight of powdered zinc oxide having 0.3 part by weight of mercuric oxide mixed therewith. After a time interval adequate for the homogeneous mixing of the zinc oxide into the thermoplastic resin, the mixture is extruded into rods around the central conducting cores 16. After extrusion, the pencils 15 may be cut to the desired length and placed in their retaining tubes 17 following which the polyethylene oxide may be leached therefrom by soaking the pencil filled tubes in a water bath. This leaves the zinc oxide bound in a microporous matrix of the polyethylene. The same process may be used to produce active material pencils of iron or cadmium.

When zinc is the active material the pencils 15 may also be made according to the teachings of the co-pending application of J. C. Duddy, Serial No. 744,544, filed June 25, 1958, Patent No. 3,003,015. As disclosed in that application, the pencils may be produced by means of a process in which a soluble thermoplastic resin such as polyethylene oxide is used as a temporary binder for the active material of the electrode. More particularly, zinc oxide is thoroughly and intimately mixed into plasticized polyethylene oxide which is water soluble but only slightly soluble in strong alkaline solutions. The plasticized resin and zinc oxide is then extruded to form the pencils 15. For application in the anode 14 of the oxygen depolarized cell of the present invention, the pencils 15 as extruded may be spirally wrapped with fiber reinforced regenerated cellulose and then placed within the retaining tubes 17. Next the tubes 17 are formed in a strong alkaline solution converting the zinc oxide to spongy metallic zinc. Following the formation of the tubes, they are then subjected to a water bath and substantially all of the polyethylene oxide leached therefrom leaving tubes 17 filled with active spongy zinc.

By way of example of the performance of a gas depolarized cell in acocrdance with the present invention utilizing oxygen as its gaseous depolarizer, a cell was constructed utilizing a gas electrode which was 8½ inches long and 3.6 inches in circumference. This electrode was made in the manner described hereinbefore and comprised of a cylinder of sintered silver and nickel particles in which the nickel was present in an amount of one part by weight to six parts by weight of the silver. The cell anode comprised 15 pencils of active zinc material, 9 inches in length and approximately ½ inch in diameter. The anode contained 270 grams of active metallic zinc. The cell electrolyte comprised a 27% solution of potassium hydroxide. The cell was operated with an oxygen depolarizer at 5 pounds per square inch gage pressure. The cell had an output voltage of 1.0 volt for 20 ampere load. The cell delivered approximately 200 ampere hours of current before the anode required recharging.

As noted hereinbefore, the anode 14 can be recharged in situ by breaking the electrical connection between the gas feed tube 5 and the gas electrode 4 by unscrewing the nut 11. For recharging, the gas feed tube 5 should also be disconnected from the gas source to relieve the pressure from the interior of the gas electrode in order that the electrolyte will fill the center of the electrode and contact the gas feed tube 5 which may be utilized as a dummy electrode. It should also be noted that when the cell is not being operated and astatic pressure is maintained within the gas electrode 4, the electrolyte within the cell will not rise in the gas electrode assembly beyond the level of the gas input port 13. For this reason, it is advantageous to provide the gas input port as near the bottom of the electrode structure as practical to limit the flooding of the gas electrode with electrolyte and thereby avoiding the necessity of purging the electrode of electrolyte on cell start-up.

From the foregoing it can be seen that the cell construction described hereinbefore provides a gas depolarized cell which accomplishes all of the objects set forth. It should be understood, however, that while the cell has been described as being adapted to utilize oxygen as the gaseous depolarizer, that it can be also operated at a lower efficiency utilizing air as the depolarizing gas as opposed to pure oxygen. As will be understood by those skilled in the art, when oxygen or air are utilized as the depolarizing gas, the zinc, cadmium or iron is discharged to an oxide. When chlorine is utilized as the depolarizing gas, the zinc, cadmium or iron is converted to a chloride. The use of chlorine also provides higher cell voltages.

What is claimed as new is:

1. A gas depolarized cell comprising a container, an alkaline electrolyte within said container, an electrically conductive gas feed tube disposed within a cylindrical microporous metallic gas electrode, said gas feed tube having a gas input port located within said gas electrode, end caps firmly attached to said gas feed tube and disposed so as to support and seal the ends of said gas electrode, said gas feed tube extending through the end cap sealing the bottom of said gas electrode so that said gas feed tube is in contact with the electrolyte within said container between said end cap and the bottom of the container, means for electrically connecting said gas electrode to said gas feed tube, and an anode having spaced pencils of electrochemically active material, said pencils being disposed about said cylindrical gas electrode.

2. A gas depolarized cell in accordance with claim 1 in which said gas electrode comprises a microporous cylinder of sintered material which contains silver.

3. A gas depolarized cell in accordance with claim 1 in which said anode is rechargeable and is prepared from a material selected from the group consisting of zinc, cadmium and iron.

4. A gas depolarized cell in accordance with claim 3 in which said means for electrically connecting said gas electrode to said gas feed tube is adapted to be disconnected from said gas electrode in order to recharge said anode in situ.

5. A gas depolarized cell in accordance with claim 4 in which said gas feed tube contains a gas outlet port near the lower end of said gas electrode.

6. A gas depolarized cell comprising a container, an alkaline electrolyte within said container, an electrically conductive gas feed tube disposed within a cylindrical microporous metallic gas electrode containing silver, said gas feed tube extending outside of said container, molded end caps firmly attached to said gas feed tube and disposed so as to support and seal the ends of said gas electrode, means for electrically conecting said gas electrode to said gas feed tube which means is adapted to be disconnected from said gas electrode, said gas feed tube containing a gas input port within and near the lower end of said gas electrode, said gas feed tube extending through the end cap sealing the bottom of said gas electrode so that said gas feed tube is in contact with the electrolyte within said container between said end cap and the bottom of the container, and a rechargeable anode having spaced pencils of an electrochemically active material selected from the group consisting of zinc, cadmium and iron, said active material being mounted on electrically conductive cores and enclosed in a porous retaining sheath of a material resistant to the electrolyte and reactions occurring in the cell, and said pencils of active material being disposed about said cylindrical gas electrode.

References Cited in the file of this patent

UNITED STATES PATENTS

| | | |
|---|---|---|
| 1,359,881 | Emanuel | Nov. 23, 1920 |
| 2,275,281 | Berl | Mar. 3, 1942 |
| 2,350,752 | Graf | June 6, 1944 |
| 2,935,547 | Kordesch | May 3, 1960 |
| 2,938,064 | Kordesch | May 24, 1960 |

FOREIGN PATENTS

| | | |
|---|---|---|
| 233,847 | Australia | May 17, 1961 |